F. AHOND.
TOOL OF CIRCULAR SHAPE WITH CUTTING TEETH, SUCH AS SCREW TAPS, SCREW PLATES, BORING TOOLS, AND MILLING CUTTERS.
APPLICATION FILED MAR. 12, 1918.
1,309,232.
Patented July 8, 1919.
2 SHEETS—SHEET 1.
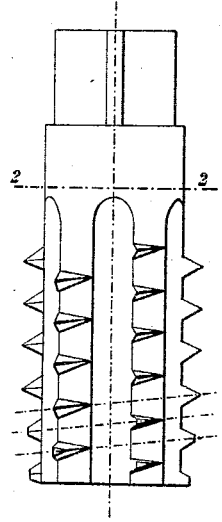
Fig. 1
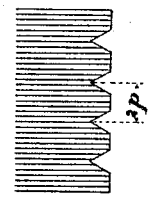
Fig. 3
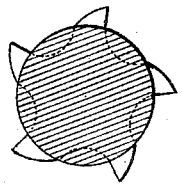
Fig. 2
Fig. 4
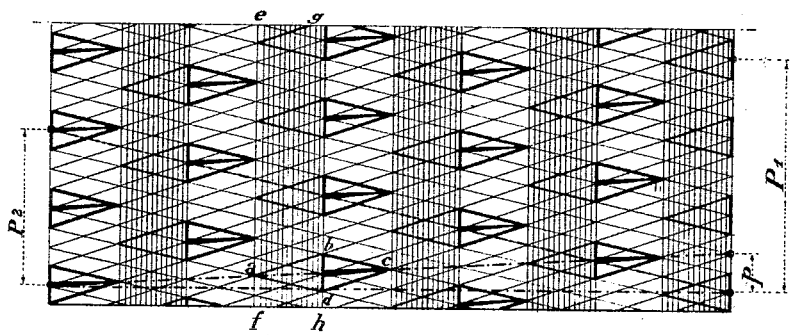
Fig. 5
Fig. 6
INVENTOR
Felix Ahond
ATTY
THE COLUMBIA PLANOGRAPH CO., WASHINGTON, D. C.

F. AHOND.
TOOL OF CIRCULAR SHAPE WITH CUTTING TEETH, SUCH AS SCREW TAPS, SCREW PLATES, BORING TOOLS, AND MILLING CUTTERS.
APPLICATION FILED MAR. 12, 1918.

1,309,232.

Patented July 8, 1919.
2 SHEETS—SHEET 2.

INVENTOR:
Felix Ahond
ATT'Y

THE COLUMBIA PLANOGRAPH CO., WASHINGTON, D. C.

UNITED STATES PATENT OFFICE.

FELIX AHOND, OF PARIS, FRANCE.

TOOL OF CIRCULAR SHAPE WITH CUTTING-TEETH, SUCH AS SCREW-TAPS, SCREW-PLATES, BORING-TOOLS, AND MILLING-CUTTERS.

1,309,232. Specification of Letters Patent. Patented July 8, 1919.

Application filed March 12, 1918. Serial No. 221,995.

*To all whom it may concern:*

Be it known that I, FELIX AHOND, citizen of the Republic of France, residing at 5 Boulevard Ornano, Paris, in the Republic of France, have invented new and useful Improvements in Tools of Circular Shape with Cutting-Teeth, Such as Screw-Taps, Screw-Plates, Boring-Tools, and Milling-Cutters, of which the following is a specification.

This invention relates to tools with cutting teeth, such as screw taps, screw plates, boring tools and milling cutters, these being essentially characterized by the shape of their teeth which are backed off, while the core of the tool preserves its circular form. This spiral shape of the teeth is produced by the crossing of two screw thread cuts in the contrary sense and having respectively the pitch formulæ:

$$P_1 = P(N+1)$$
$$P_2 = P(N-1)$$

in which P is the pitch of the final screw thread and N the number of longitudinal cuts.

The backing off of the teeth, as is well known by those skilled in the art, is of special importance, as the wearing away of the tool and the power to be employed are thereby diminished. The teeth are backed off laterally and can also be backed off along the diameter of the tool, viz., along its width and along its height, and the core retains its circular shape. This latter arrangement which consists in preserving the circular shape of the core is of special importance, for in all methods employed up to the present time for backing off the teeth, it has been necessary to produce corresponding grooves in the core, which thus lost its circular shape and as these grooves or cuts gave rise in a certain measure to cutting edges, the work was performed under defective conditions, since the tool was no longer centered by means of its core.

Referring to the accompanying drawing which illustrates the invention by way of example;

Figure 1 illustrates a screw tap with interrupted teeth, according to the invention.

Fig. 2 shows a horizontal section along the line 2—2 of Fig. 1.

Figs. 3 and 4 show parts of two kinds of tools for screw threading of the screw tap.

Fig. 5 illustrates the surface of the screw tap when opened out along a generatrix and indicates at the same time the manner in which the backing off and the interruption of the teeth are obtained.

Fig. 6 is a perspective view of a form of tooth according to the invention.

Broadly speaking, if it is desired to manufacture a screw cutting tool, such as the screw tap illustrated in Fig. 1, having N longitudinal cuts and the pitch $p$, such tool may be produced, for instance, as follows:

By using a cutting die, such as illustrated in Fig. 3, having recesses corresponding to the profile of the screw-thread and spaced apart at a distance equal to $2_p$, or a tool such as illustrated in Fig. 4, the tool to be manufactured is first screw-threaded in the sense desired for the final screw-thread (to the right or to the left), and so as to have the pitch $P_1 = p(N+1)$ and is then formed with a second screw-thread in the opposite sense to that referred to, such second screw-thread having the pitch $P_2 = p(N-1)$. The tool is thereupon completed by providing it with N longitudinal cuts passing through the apices of the projections remaining on the core.

It will be seen that the core of the tool is not backed off and that it retains its circular shape.

Suppose, for instance, it is desired to manufacture a screw tap having a triangular right hand screw-thread with 5 longitudinal cuts, the pitch of the thread being 4 mms. For this purpose the body of the tool is provided, by means of the cutting die shown in Fig. 3, first with a right hand screw-thread having a pitch $P_1 = 4$ mms. $(5+1) = 24$ mms. and then with a left hand screw-thread having a pitch $P_2 = 4$ mms. $(5-1) = 16$ mms.

Assuming the cylindrical screw tap be developed along a generatrix as shown in Fig. 5, after the two-screw-threads have been formed thereon, it will be seen:

Firstly, that the only projections left on the core of the screw tap are rhombehedrons having the base $a\ b\ c\ d$ and the height of the screw-thread, as shown in thick lines;

Secondly, that the long diagonal $a\ c$ of the base of these rhombehedrons comes to be exactly along a helix having the pitch desired to be imparted to the screw tap, viz., $p = 4$ mms.

Thirdly, that if the screw tap is provided by means of a milling cutter, with 5 longitudinal cuts, such as $e\ f\ g\ h$, shown in hatched lines in Fig. 5, the edge $g\ h$ passing through the apices of the rhombehedrons will be formed with teeth having exactly the same profile as the required screw-thread, being spaced apart at a distance equal to twice the pitch and alternating with one another in each two adjacent cuts.

The teeth thus obtained with a triangular screw-thread have the shape illustrated in Fig. 6, that is to say, they are backed off on their lateral sides as well as along the diameter.

Figure 7:
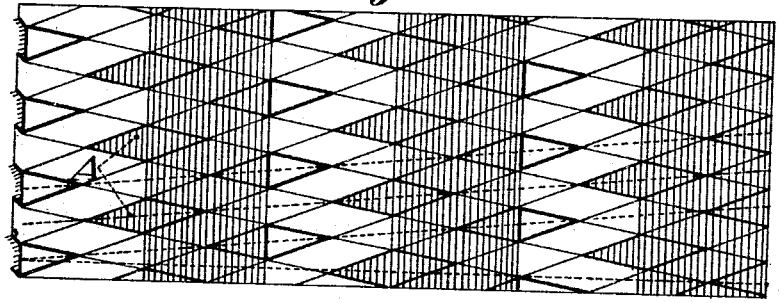
Fig. 7 illustrates the application of the present method to the manufacture of a screw tap with square thread and continuous teeth.

When the profile of the thread $a$, for instance in square threads, has a width equal to or less than one half the pitch, the present method allows of manufacturing tools with continuous teeth, and the milling cutter, lathe tools, etc., has the complementary form of the screw thread for only a single pitch. But it is necessary to produce a final screw thread having the definite pitch, and this serves the double purpose of removing any slight irregularity in the teeth and of removing the portion A, as shown in Fig. 7. The tools which are thus obtained will possess the same fundamental qualities as tools with interrupted teeth, as obtained, by the method shown in Fig. 5, these qualities being the lateral backing off of the teeth and the preservation of the circular shape of the core.

Figure 8:
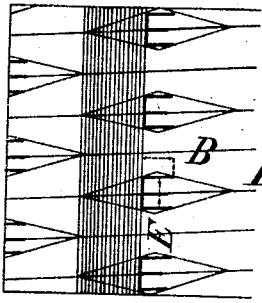
Figs. 8 to 12 show various forms produced by the application of the present process.

As the smooth working of the screw tap depends especially upon the small extent of the surfaces in contact, it is an advantage to manufacture these tools (screw taps, for instance) with a profile somewhat larger than required, and then to bring them to the definite profile by the use of a cutting die which cuts off the angles of the smaller base of the tooth as shown in Fig. 8.

In such case the tooth has a constant section E of a short length such as will not hinder the easy working of the tool but which at the same time allows of making the cut at the commencement of the operation and thus of obtaining a certain amount of metal B in reserve for sharpening purposes.

Figure 9:
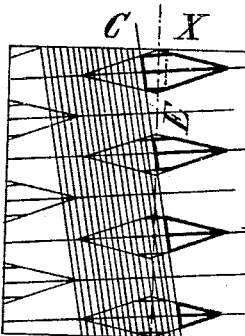

The cuts C D can also be made in an oblique direction with reference to the axis X—Y of the apices, as shown in Fig. 9, and this affords the double advantage of obtaining the first teeth, (side D) with a good backing off and with a section which is less than the profile, while the last teeth (side C) have the standard profile and finish up the preparatory work of the first teeth, having at the same time a constant section E which is advantageous for sharpening and for the good wear of the tooth.

Figure 10:
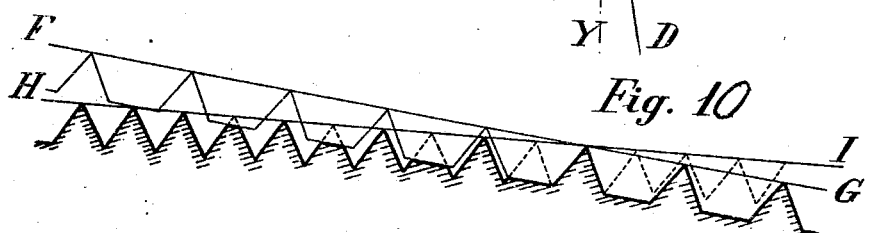

Should the backing off, in the above process, be carried out according to a cone F G having a smaller inclination than that of cutting die H I which may even be of cylindrical shape, this will afford a screw tap in which the first teeth are backed off and interrupted, while the last teeth are not backed off and are continuous, as shown in Fig. 10.

Figure 11:
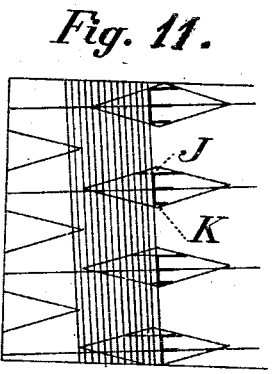
Figure 12:
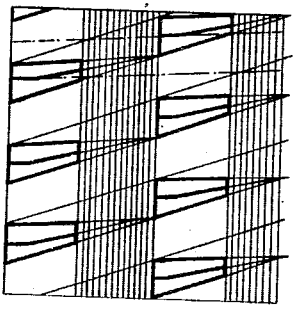

The backing off of the teeth may also be carried out at a pitch which differs slightly from that of the cutting die, and in this case the lateral truncated portions J and K of the teeth are dissymmetrical. This method of cutting is shown in Fig. 11, and it confers different cutting qualities upon the cutting edges of the teeth, so that it can be employed to advantage for modifying the manner of engagement of the screw tap. For the same purpose, it may be found advantageous to suppress one of the two cuts used for lateral backing off, by the use of the method shown in Fig. 12.

It is to be understood that these different methods do not exclude the use of any desired means for radial backing off, especially in the manufacture of tools with square threads.

When the above described methods are employed in the manufacture of tools having a zero pitch, such as milling cutters for screw threads or with multiple pitch (2, 3, etc. threads), the formulæ employed for determining the pitch used for backing off, will now assume the more general forms:

$$P_1 = (N \times E) + p$$
$$P_2 = (N \times E) - p$$

in which N represents the number of longitudinal cuts, E the spacing of the pitches and $p$ the final pitch of the tool which is to be obtained.

Having now described my invention, what I claim as new and desire to secure by Letters Patent is:

A circular tool with cutting teeth, such as screw tap, screw plate, boring tool or milling cutter, comprising, in combination: teeth backed off laterally, and a core of circular shape, the teeth being formed by the crossing of two screw threads in opposite directions and having respectively the relations:

First thread, $P_1 = p(N+1)$
Second thread, $P_2 = p(N-1)$ in which $p$ designates the pitch of the final screw thread and N the number of longitudinal cuts, substantially as described and for the purpose set forth.

In testimony whereof I have signed my name to this specification in the presence of two subscribing witnesses.

FELIX AHOND.

Witnesses:
Louis Moses,
Chas. P. Pressly.